(12) United States Patent
Himukashi (10) Patent No.: US 11,330,240 B2
(45) Date of Patent: May 10, 2022

(54) INFORMATION PROCESSING SYSTEM, INFORMATION PROCESSING METHOD AND NON-TRANSITORY COMPUTER READABLE MEDIUM

(71) Applicant: JVCKENWOOD CORPORATION, Yokohama (JP)

(72) Inventor: Takashi Himukashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/075,312

(22) Filed: Oct. 20, 2020

(65) Prior Publication Data

US 2021/0120218 A1 Apr. 22, 2021

(30) Foreign Application Priority Data

Oct. 21, 2019 (JP) .............................. JP2019-192218

(51) Int. Cl.
*H04N 13/117* (2018.01)
*H04N 13/106* (2018.01)
*G11B 27/031* (2006.01)
*H04N 13/282* (2018.01)
*G06F 3/0482* (2013.01)

(52) U.S. Cl.
CPC ......... *H04N 13/117* (2018.05); *G11B 27/031* (2013.01); *H04N 13/158* (2018.05); *H04N 13/282* (2018.05); *G06F 3/0482* (2013.01)

(58) Field of Classification Search
CPC ......... H04N 21/21805; H04N 21/6587; H04N 13/117; H04N 13/282; H04N 21/2668; H04N 13/158; H04N 21/2187; G06F 3/0482; G11B 27/031
See application file for complete search history.

(56) References Cited

U.S. PATENT DOCUMENTS

2018/0359458 A1* 12/2018 Iwakiri ................. G06T 15/205
2020/0097749 A1*  3/2020 Ikeda .................. G06K 9/00671
2021/0235768 A1*  8/2021 Akao ........................ A24F 47/00

FOREIGN PATENT DOCUMENTS

JP        2015-225529 A      12/2015

* cited by examiner

*Primary Examiner* — Loi H Tran
(74) *Attorney, Agent, or Firm* — Procopio, Cory, Hargreaves & Savitch LLP (57) ABSTRACT

An information processing system includes a user-specified video creation unit configured to create a user-specified video to be distributed to a user terminal from a free-viewpoint video created based on a plurality of captured images captured by a plurality of cameras, an accepting unit configured to accept an instruction of changing setting of a virtual camera from the user terminal, a determination unit configured to determine whether a user needs assistance in setting a viewpoint of the virtual camera based on the instruction from the user accepted by the accepting unit, and a switching unit configured to switch an image being displayed on the user terminal to another image when the determination unit determines that the user needs assistance in setting the viewpoint.

3 Claims, 7 Drawing Sheets

INFORMATION PROCESSING SYSTEM, INFORMATION PROCESSING METHOD AND NON-TRANSITORY COMPUTER READABLE MEDIUM

CROSS REFERENCE TO RELATED APPLICATION

This application is based upon and claims the benefit of priority from Japanese patent application No. 2019-192218, filed on Oct. 21, 2019, the disclosure of which is incorporated herein in its entirety by reference.

BACKGROUND

The present disclosure relates to an information processing system, an information processing method and a program.

A technique has been known which creates three-dimensional model space data based on a captured video from a plurality of high-resolution cameras (real cameras) installed in a stadium, and reproduces a video (free-viewpoint video) from virtual cameras arranged at arbitrary positions in the three-dimensional model space data. When a fifth-generation mobile communication system (so-called "5G") is started in the future, more generally, it is expected that spectators watching sports such as soccer games at stadiums are enabled to receive and view such free-viewpoint videos through their portable terminals. Japanese Unexamined Patent Application Publication No. 2015-225529 discloses that the position and direction of a virtual camera are determined based on the position and direction of a user terminal.

SUMMARY

When a target (for example, a player) whom a user desires to watch moves, the user needs to follow the target by his/her own operation and change the setting of a virtual camera. However, such switching and setting of the virtual camera is affected by the skill level of the operation, and thus is not easy for a user who is not familiar with the operation. Furthermore, in the technique described in Japanese Unexamined Patent Application Publication No. 2015-225529, it is not possible to detect or determine that the user is taking time to perform the switching and setting of the virtual camera. While the user takes a long time to switch and set the virtual camera, the game progresses in sequence. As a result, the user may lose his/her concentration on the game itself or miss a significant scene.

An information processing system according to one aspect of the present embodiment comprises:

a user-specified video creation unit configured to create a user-specified video to be distributed to a user terminal from a free-viewpoint video created based on a plurality of captured images captured by a plurality of cameras;

an accepting unit configured to accept an instruction of changing setting of a virtual camera from the user terminal;

a determination unit configured to determine whether a user needs assistance in setting a viewpoint of the virtual camera based on the instruction from the user accepted by the accepting unit; and a switching unit configured to switch an image being displayed on the user terminal to another image when the determination unit determines that the user needs assistance in setting the viewpoint.

An information processing method according to one aspect of the present embodiment comprises:

a user-specified video creation step of creating a user-specified video to be distributed to a user terminal from a free-viewpoint video created based on a plurality of captured images captured by a plurality of cameras;

an accepting step of accepting an instruction of changing setting of a virtual camera from the user terminal;

a determination step of determining whether a user needs assistance in setting a viewpoint of the virtual camera based on the instruction from the user accepted in the accepting step; and a switching step of switching an image being displayed on the user terminal to another image when it is determined in the determination step that the user needs assistance in setting the viewpoint.

A program according to one aspect of the present embodiment causes a computer to execute:

a user-specified video creation step of creating a user-specified video to be distributed to a user terminal from a free-viewpoint video created based on a plurality of captured images captured by a plurality of cameras;

an accepting step of accepting an instruction of changing setting of a virtual camera from the user terminal;

a determination step of determining whether a user needs assistance in setting a viewpoint of the virtual camera based on the instruction from the user accepted in the accepting step; and a switching step of switching an image being displayed on the user terminal to another image when it is determined in the determination step that the user needs assistance in setting the viewpoint.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Hereinafter, a specific embodiment to which the present disclosure is applied will be described in detail with reference to the drawings. However, the present disclosure is not limited to the following embodiment. Further, the following description and drawings are simplified as appropriate for the sake of clarity.

Figure 1:
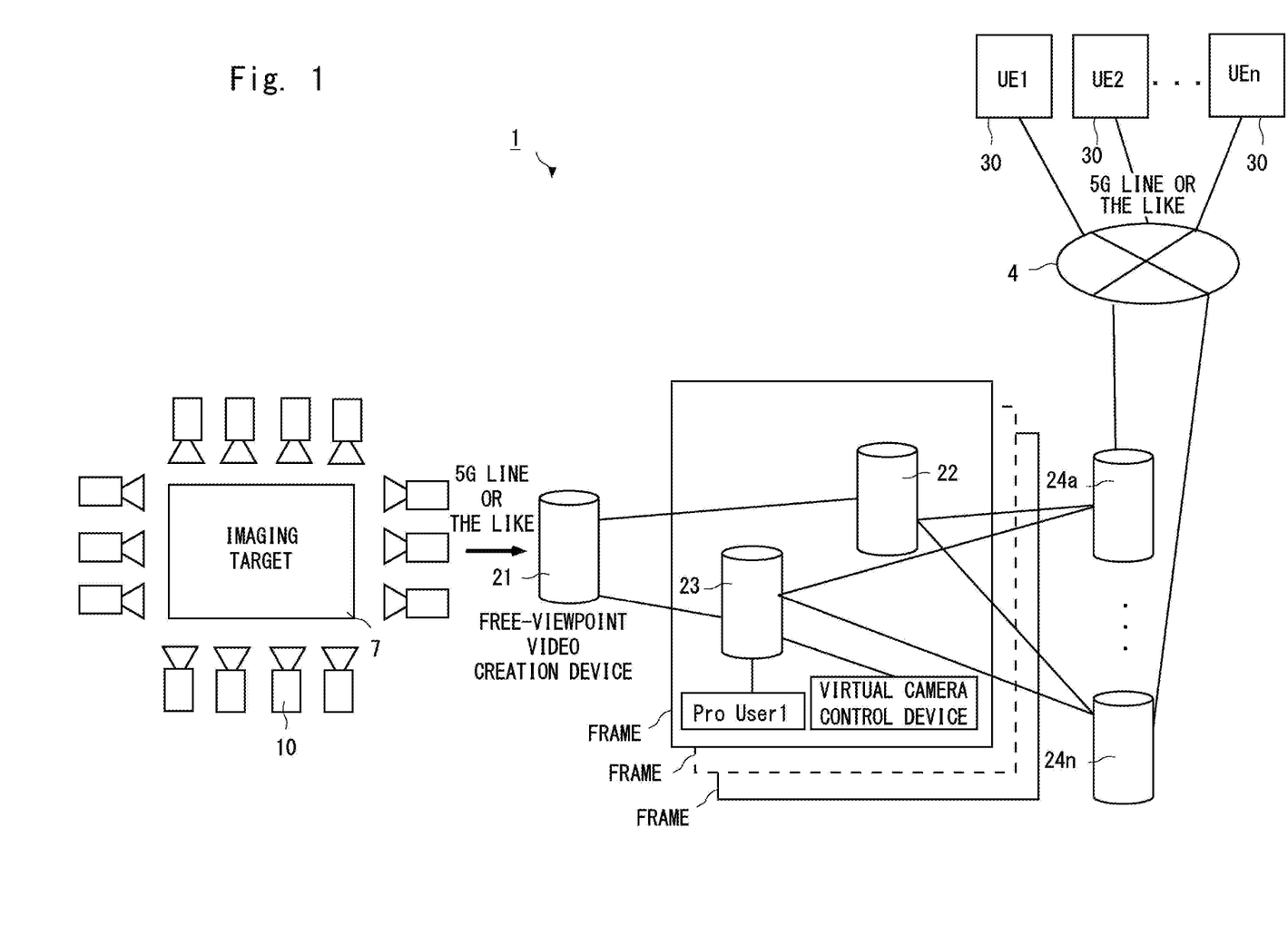
FIG. 1 is a diagram showing an overall configuration of an information processing system according to an embodiment of the present disclosure.

FIG. 1 is a diagram showing an overall configuration of an information processing system 1 according to an embodiment of the present disclosure.

The information processing system 1 includes a free-viewpoint video creation device 21, a user-specified video creation device 22, a professional-specified video creation device 23, one or more video distribution devices 24a to 24n, and one or more user terminals 30, which are connected to one another via a network. The network mentioned here includes a LAN (Local Area Network), a WAN (Wide Area Network), the Internet, a cellular network, or another suitable wired or wireless communication network. Note that these devices 21, 22, 23, 24 perform main operations of the present system, and are configured by a server, a computer, and the like. As shown in figures, the present system includes five or more servers and is configured to perform distributed processing, but the present disclosure is not limited to this configuration, and may be a physically single server.

The free-viewpoint video creation device 21 creates a free-viewpoint video based on a captured video received from a plurality of real cameras 10 arranged around an imaging target via a mobile phone network such as a 5G line. The thus-created free-viewpoint video is sent to the user-specified video creation device 22 and the professional-specified video creation device 23. A virtual camera can freely move in such free viewpoint video data to capture a video from a predetermined position. In this example, a field 7 where a ball game such as a soccer game is played is supposed as an imaging target, but the present disclosure is not limited to this style. All sports (athletics, gymnastics, swimming, marathons, etc.) can be envisioned as an imaging target.

The user-specified video creation device 22 creates a user-specified video based on the received free-viewpoint video. The user-specified video creation device 22 receives a change instruction such as the position setting of the virtual camera from the user terminal 30. The user-specified video mentioned here may be any types of videos which are created based on the free-viewpoint video and are to be supplied to the user, such as an overhead-view video (initial free-viewpoint image) to be distributed to the user, a virtual camera video obtained by the user himself/herself setting the position of the virtual camera using the user terminal 30, and an image for setting the position of the virtual camera by the user (an image screen for setting a viewpoint). The thus-created user-specified video is sent to the video distribution device 24, and then distributed to the user terminal 30.

The professional-specified video creation device 23 creates, as a video to be distributed to the user terminal, a video created by a professional user who is accustomed to the position setting operation of the virtual camera, or a video for which the virtual camera position is automatically set by a computer. For example, a professional user who is skilled in viewpoint setting can create a professional-specified video (also called a virtual camera setting video by a professional user) by setting an appropriate position of a virtual camera on a free-viewpoint video sent in real time by using a video-editable computer connected to the professional-specified video creation device 23. Alternatively, a computer (also referred to as a virtual camera control device in FIG. 1) can create a professional-specified video (also called a virtual camera setting video by a computer) by automatically setting an appropriate position of the virtual camera (for example, a position at which a ball and a player close to the ball are viewed) to a free-viewpoint video sent in real time. Details will be described later with reference to FIG. 4. The thus-created professional-specified video is sent to the video distribution device 24a to 24n.

The video distribution device 24 distributes a user-specified video or a professional-specified video to the user terminal 30 via the Internet or a mobile phone network such as a 5G line. Since transmission capacity increases explosively on 5G lines, various companies (e.g., KDDI) are implementing technologies for realizing 3D data broadcast by converting videos obtained by imaging a real game (a soccer game, a baseball or the like) with many cameras into 3D data. A viewer who receives this 3D data broadcast can watch the game from his/her favorite viewpoint (free viewpoint). However, it is difficult for the viewer to set an optimal viewpoint for each phase of the game in the case of a game such as soccer where the development is fast. Therefore, the present embodiment solves such a problem.

Figure 2:
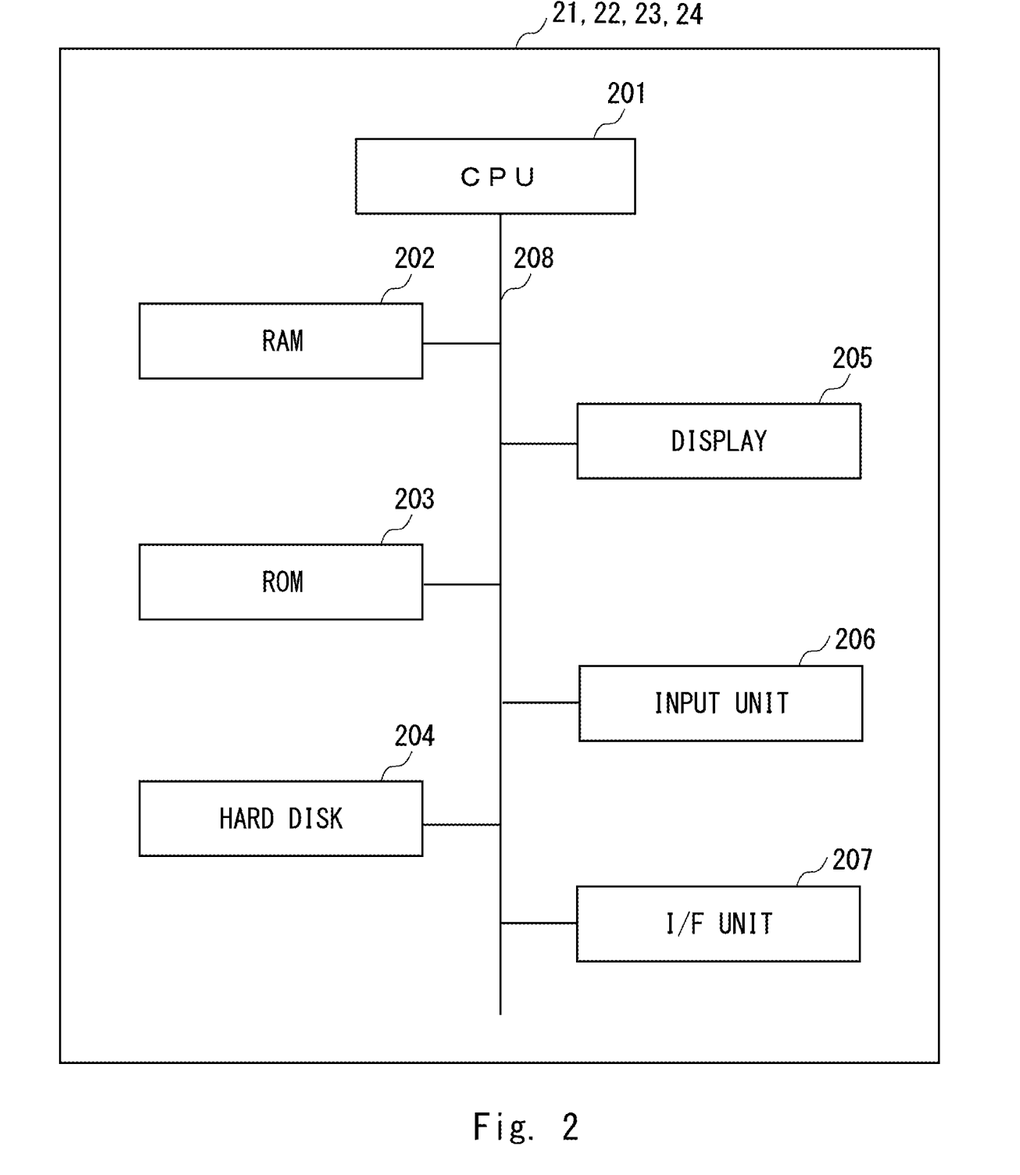
FIG. 2 is a block diagram illustrating a hardware configuration of each server.

FIG. 2 is a block diagram showing a hardware configuration example of the servers 21, 22, 23, and 24 in the present embodiment. As shown in FIG. 2, a control unit of the servers 21, 22, 23, and 24 of the present embodiment is a computer having CPU (Central Processing Unit) 201, RAM (Random access memory) 202, ROM (Read Only Memory) 203, and the like. The CPU 201 performs calculation and control according to software stored in the RAM 202, ROM 203, or a hard disk 204. The RAM 202 is used as a temporary storage area when the CPU 201 executes various processing. The hard disk 204 stores an operating system (OS), a registration program described later, and the like. A display 205 is configured by a liquid crystal display and a graphic controller, and the display 205 displays objects such as images and icons, GUI and the like thereon. An input unit 206 is a device for inputting various instructions to the servers 21, 22, 23, and 24 by the user, and is configured by, for example, a mouse or a keyboard. An I/F (interface) unit 207 can control wireless LAN communication and wired LAN communication compatible with standards such as IEEE 802.11a, and can communicate with external equipment via the same communication network and the Internet based on a protocol such as TCP/IP. A system bus 208 controls data exchange with the CPU 201, the RAM 202, the ROM 203, the hard disk 204, and the like.

Figure 3:
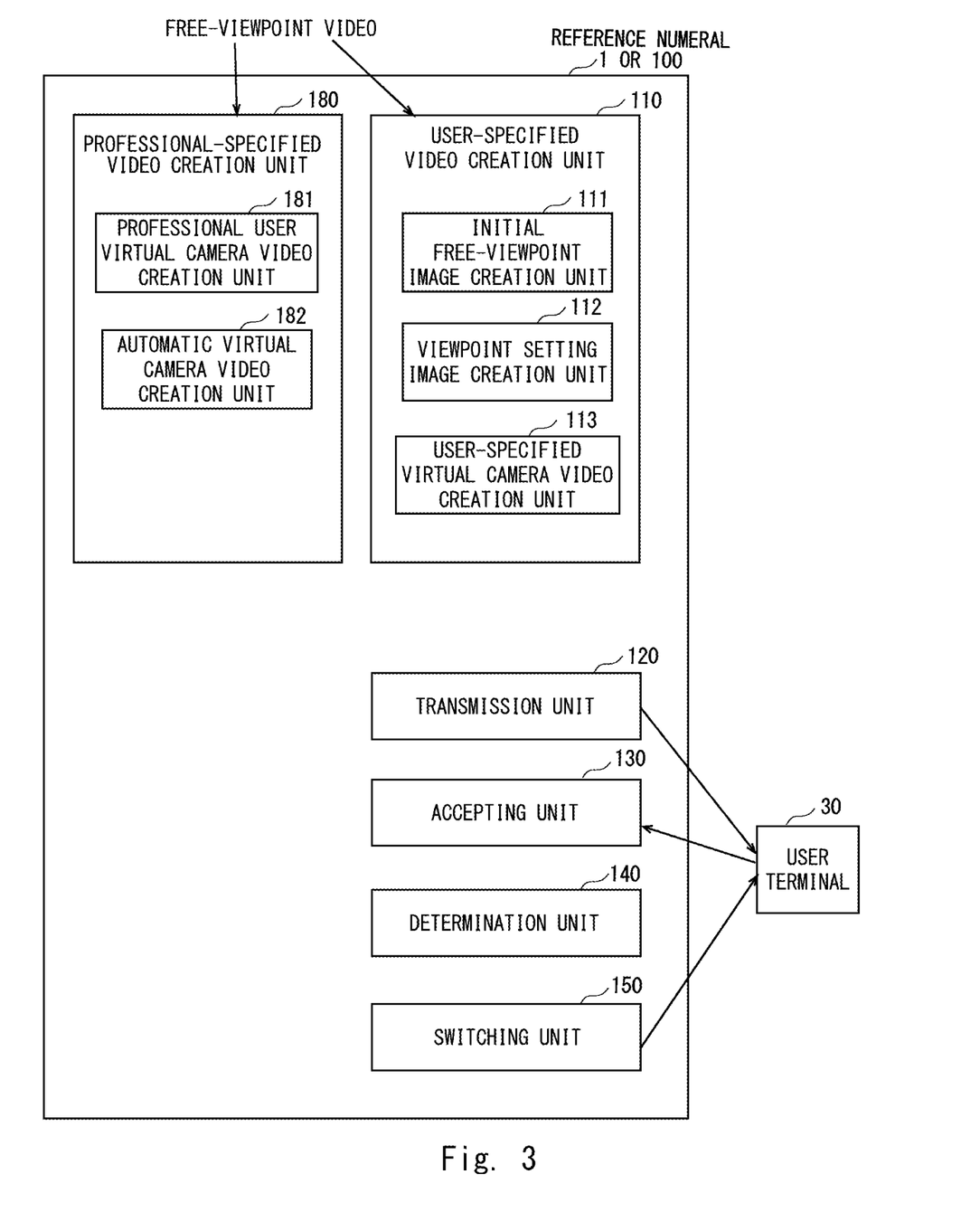
FIG. 3 is a block diagram illustrating a configuration of the information processing system or an information processing device according to the embodiment of the present disclosure.

An outline of the information processing device according to a first embodiment of the present disclosure will be described with reference to FIG. 3. FIG. 3 is a block diagram showing a configuration of an information processing system 1 or an information processing device 100 according to the first embodiment.

The information processing system 1 or the information processing device 100 includes a user-specified video creation unit 110 for creating a user-specified video to be distributed to a user terminal 30 from a free-viewpoint video created based on a plurality of captured images captured by a plurality of cameras 10, an accepting unit 130 for accepting an instruction of changing the setting of a virtual camera from the user terminal 30, a determination unit 140 that, based on the user's instruction accepted by the accepting unit 130, determines whether the user has lost the viewpoint and needs assistance from a situation where the user has a trouble in setting the viewpoint of the virtual camera, and a switching unit 150 for switching an image being displayed on the user terminal 30 to another image when the determination unit 140 determines that the user needs assistance in setting the viewpoint.

The CPU 201 executes the program to cause the control unit to function as the user-specified video creation unit 110, the accepting unit 130, the determination unit 140, and the switching unit 150 described above. As mentioned above, these functions may be implemented by separate hardware. In other words, these functions can be realized by the user-specified video creation device 22, the professional-specified video creation device 23, and the video distribution device 24, which constitute the information processing system 1 described above.

According to the information processing device of the present embodiment described above, it is possible to determine whether the user has lost his/her viewpoint and needs assistance in switching and setting the virtual camera, whereby a video to be sequentially distributed can be switched to an appropriate screen.

Next, the detailed configuration of the information processing device will be described with reference to FIG. 3.

The information processing system 1 or the information processing device 100 includes the user-specified video creation unit 110, a professional-specified video creation unit 180, a transmission unit 120, the accepting unit 130, the determination unit 140, and the switching unit 150. The user-specified video creation unit 110 further includes an initial free-viewpoint image creation unit 111, a viewpoint setting image creation unit 112, and a user virtual camera video creation unit 113.

The initial free-viewpoint image creation unit 111 creates an initial free-viewpoint image to be sent to the user terminal 30 from the free-viewpoint video created by the free-viewpoint video creation device 21 or the like. The initial free-viewpoint image is an image that is first transmitted to the user terminal 30 before the user starts to set a viewpoint of a virtual camera, and may be, for example, an overhead image of an imaging target or a virtual 360-degree video.

The viewpoint setting image creation unit 112 creates a viewpoint setting image (also referred to as a viewpoint setting window) to be presented to the user from the free-viewpoint video created by the free-viewpoint video creation device 21 or the like. The viewpoint setting image is an image to be displayed on a display of the user terminal 30 when the user sets the viewpoint of the virtual camera. The viewpoint setting image may be displayed on the display of the user terminal 30 by the user performing an arbitrary operation on the user terminal 30.

The user virtual camera video creation unit 113 creates a virtual camera video for which the position of the virtual camera is set in the free-viewpoint video through an arbitrary operation of the user terminal 30. Note that a signal indicating an arbitrary operation from the user terminal 30 is accepted by the accepting unit 130 and sent to each of the creation units 111, 112, 113 of the user-specified video creation unit 110.

The professional-specified video creation unit 180 further includes a professional user virtual camera video creation unit 181, and an automatic virtual camera video creation unit 182. The professional user virtual camera video creation unit 181 creates a professional user virtual camera video from the free-viewpoint video created by the free-viewpoint video creation device 21 or the like. The professional user virtual camera video creation unit 181 can create a professional user virtual camera video by setting the position of the virtual camera by one or more professional users accustomed to the viewpoint setting of the virtual camera based on the free-viewpoint video.

Further, the automatic virtual camera video creation unit 182 automatically creates a video for which the position of the virtual camera is automatically set by the computer. For example, a video in which a ball and a player close to the ball are viewed from above in an overhead view mode may be automatically created. The automatic virtual camera video creation unit 182 may automatically create such a video by using a learned model which has been machine-learned based on past movement data of players and balls. Such a learned model may be stored in a storage unit inside the information processing device 100 or may be stored in an external storage unit connected to the information processing device 100 via a network.

Figure 4:
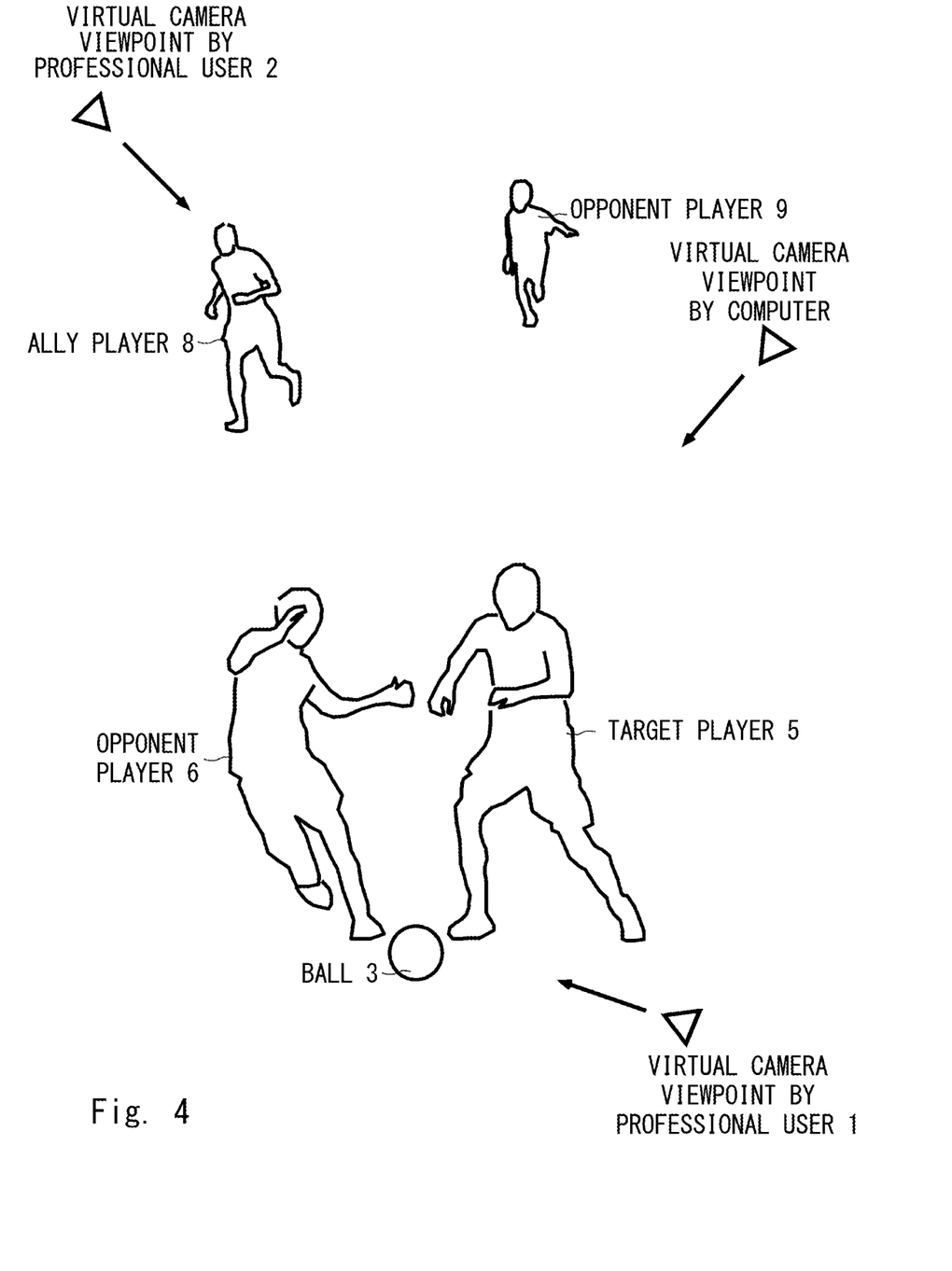
FIG. 4 is a diagram illustrating a viewpoint of a virtual camera set by a professional user and a viewpoint of a virtual camera set by a computer.

Here, a specific example of a plurality of professional-specified videos will be described with reference to FIG. 4.

In this example, the imaging target is a field where a soccer game is played. As shown in FIG. 4, a professional user 1 may set the viewpoint of a virtual camera and create a powerful video in which a ball 3, a target player 5 and an opponent player 6 are viewed from the front side. Further, another professional user 2 may create a video in which the viewpoint of the virtual camera is set so as to capture a specific player (here, an ally player 8). Further, the above-described automatic virtual camera video creation unit 182 may create a video in which the ball 3, the target player 5 and the opponent player 6 are viewed from above as a viewpoint of the virtual camera by the computer.

Videos created by a plurality of professional users or a computer can be provided to the user terminal when it is determined that the user has lost the viewpoint and thus needs assistance in setting the viewpoint of the virtual camera. As a result, even a user who is not accustomed to the position setting operation of the virtual camera can enjoy an appropriately set virtual camera video.

Figure 5:
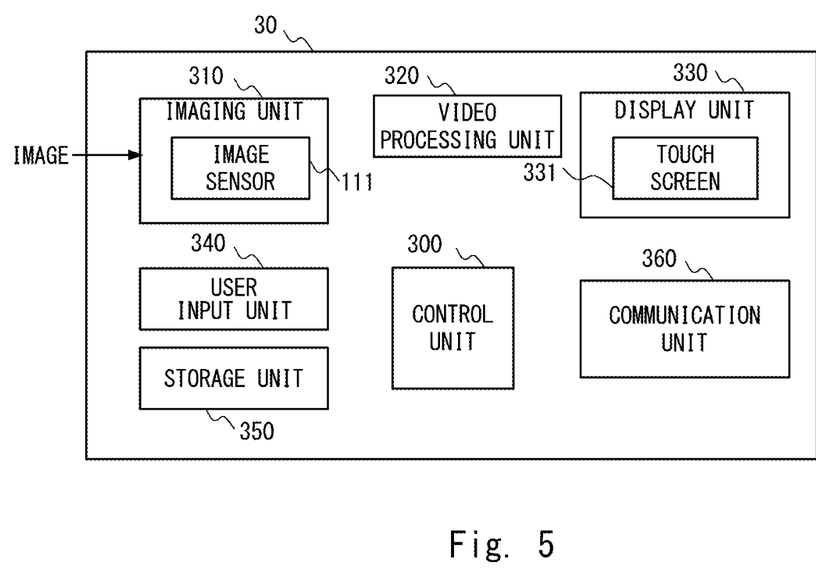
FIG. 5 is a block diagram illustrating an example of a configuration of a user terminal.

For the purpose of watching a game at a stadium, the user terminal 30 may be, for example, a smartphone, a tablet, a mobile phone, a PDA (personal digital assistant), a wearable terminal, a laptop personal computer (PC), a head mounted display (HMD) or the like. However, the present disclosure is not limited to these terminals. Further, for the purpose of watching a game at home, the user terminal 30 may be a desktop personal computer or the like. The following description will be made by exemplifying a case where the user terminal 30 is a smartphone.

FIG. 5 is a block diagram showing an example of the configuration of the user terminal. As shown in FIG. 5, the user terminal 30 includes an imaging unit (for example, a camera) 310 for capturing an external video, a video processing unit 320 for processing a video signal (including a free-viewpoint video signal) received from the outside, a display unit 330 for displaying a video signal processed by the video processing unit 320 in the form of as a video, a user input unit 340 for accepting a user's input, a storage unit 350 for storing various kinds of data, a communication unit 360 for performing wired/wireless communication with the outside, and a control unit 300 for controlling each component of the user terminal 30. The imaging unit (for example, the camera) 310 includes an image sensor 311 (for example, a CCD/CMOS image sensor). The display unit 330 also includes a touch screen 331. A client application installed in the user terminal 30 can control each of these components in order for the user to enjoy a free-viewpoint video and perform various kinds of settings. The user can use the client application of the user terminal 30 to select a target object from the free-viewpoint video, or select an arbitrary operation related to the setting of the position of the virtual camera or the like. Such an arbitrary operation signal is sent to the accepting unit 130 of the information processing device 100 via the communication unit 360.

Returning to FIG. 3 again, the detailed configuration of the information processing device will be described.

The transmission unit 120 transmits a video created by the user-specified video creation unit 110 or the professional-specified video creation unit 180 of the information processing device 100 to the outside (for example, the user terminal 30).

The accepting unit 130 accepts an instruction of changing the setting of the virtual camera (for example, opening or closing a viewpoint setting window, setting a virtual camera viewpoint, or the like) from the user terminal 30.

Figure 7:
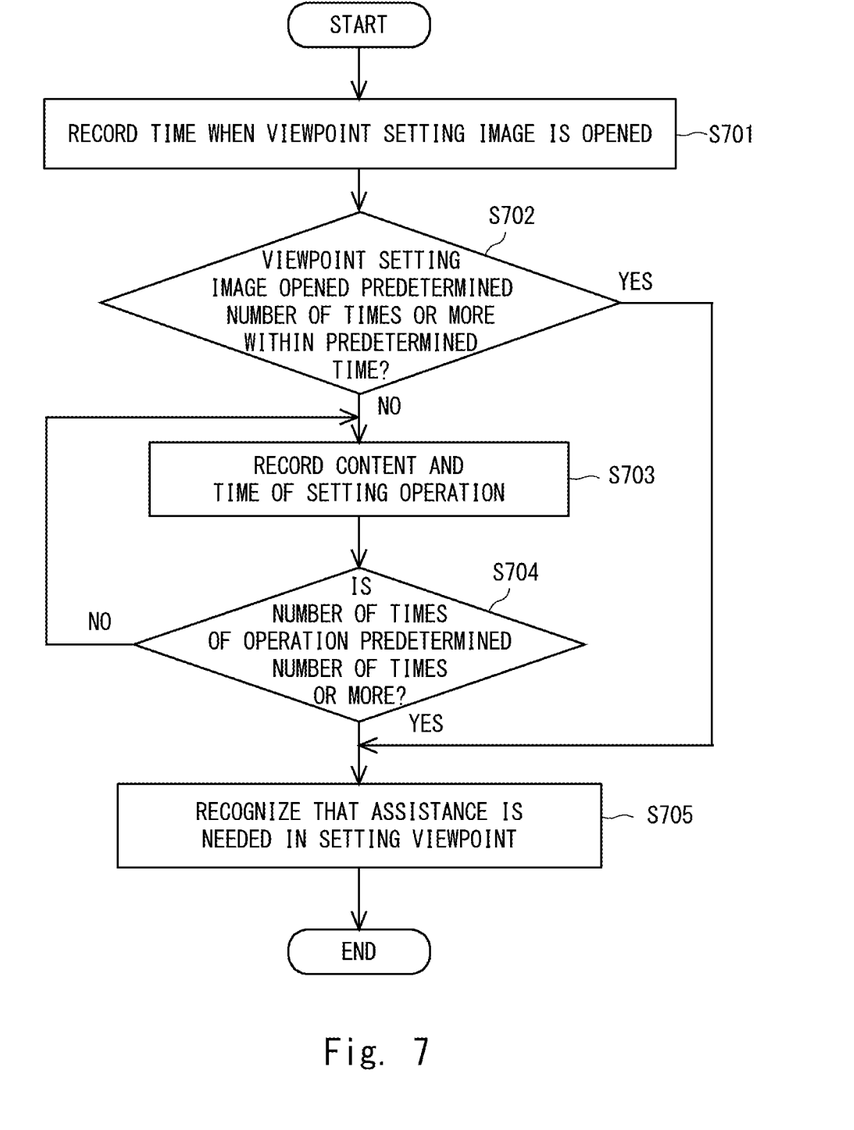
FIG. 7 is a flowchart showing determination processing of determining whether the user needs assistance in setting the viewpoint of the virtual camera.

Based on the user's instruction from the user terminal 30 which has been accepted by the accepting unit 130, the determination unit 140 determines whether the user has lost the viewpoint and needs assistance from a situation where the user has a trouble in setting the viewpoint of the virtual camera (details will be described later with reference to FIG. 7).

The switching unit 150 switches an image being displayed on the user terminal 30 to another image when the determination unit 140 determines that the user needs assistance in setting the viewpoint. The "another image" mentioned here may be, for example, a selection screen of a professional user, a professional user virtual camera video, an automatic virtual camera video, an initial free-viewpoint screen (overhead view video) or the like, but the present disclosure is not limited to these images.

Figure 6:
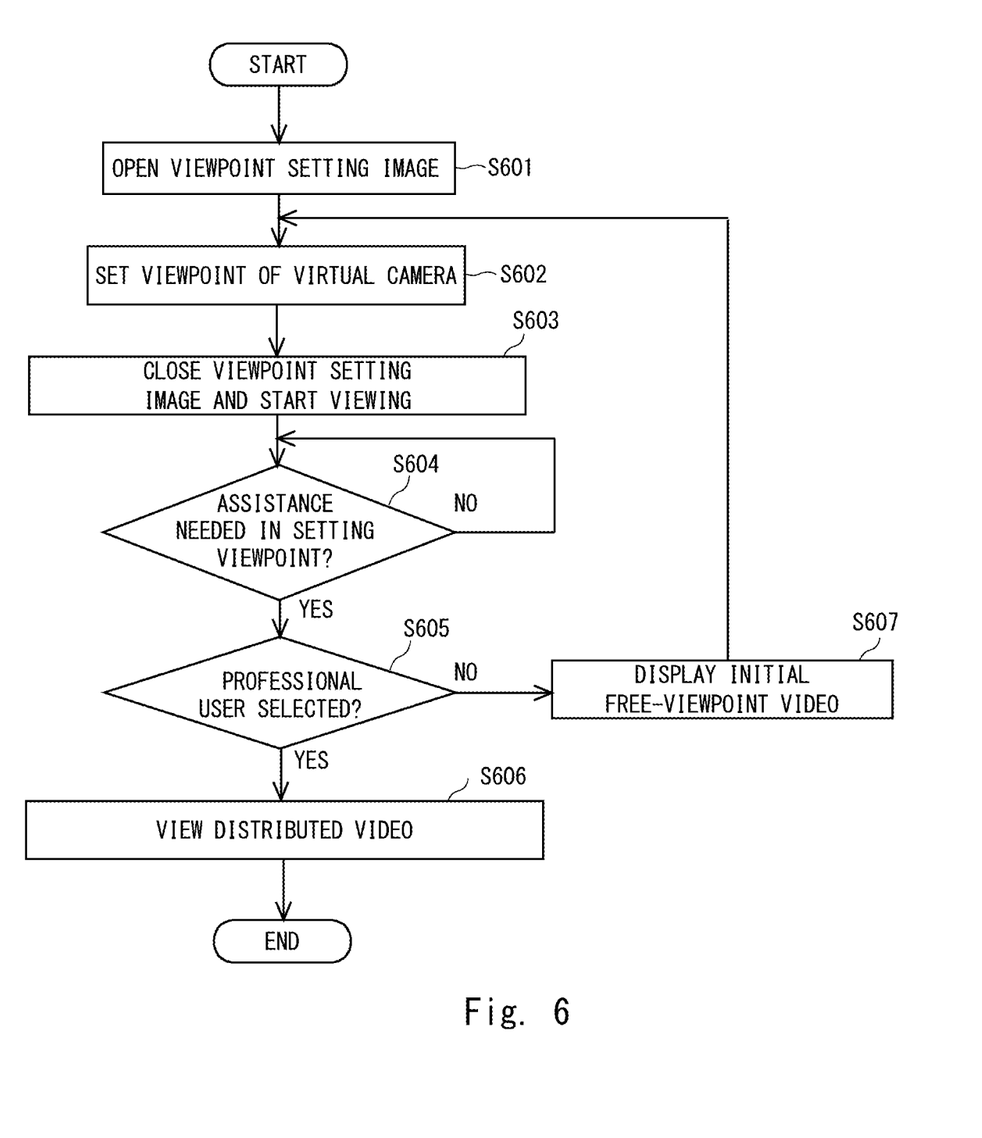
FIG. 6 is a flowchart showing viewpoint setting processing of a virtual camera by a user.

An exemplary processing flow showing the viewpoint setting processing of the virtual camera by the user according to the present embodiment will be described with reference to FIG. 6.

The user also enjoys a free-viewpoint video even in an application of the user terminal 30 while watching a soccer game at a stadium, for example. First, the user opens a viewpoint setting image (window) of the virtual camera via the application of the user terminal 30 (step S601). The user sets the viewpoint of the virtual camera in the free-viewpoint video by an arbitrary operation on the user terminal 30 (step S602). Thereafter, the user closes the viewpoint setting image (window) by an arbitrary operation on the user terminal 30, and starts to view the video (step S603). It is determined whether the user has lost the optimal viewpoint while viewing the video, that is, whether the user needs assistance in setting the viewpoint of the virtual camera (step S604). Detailed determination processing will be described later with reference to FIG. 7.

When the user has lost the optimal viewpoint, that is, when the user needs assistance in setting the viewpoint of the virtual camera (YES in step S604), the user selects his/her favorite professional user video from a presented professional-user selection screen (YES in step S605), and views a video created by a professional user (step S606).

On the other hand, when the user does not select any favorite professional user video from the professional-user selection screen (NO in step S605), the initial free-viewpoint video (overhead view video) is displayed on the display (step S607), and the user sets a viewpoint of the virtual camera again (step S602).

Next, the processing of determining whether the user has lost his/her viewpoint and needs assistance in setting the viewpoint of the virtual camera will be described.

The determination unit 140 of the information processing device 100 makes such a determination in cooperation with the accepting unit 130 for accepting an instruction from the user terminal 30. Specifically, whether the user has lost the viewpoint is determined from the viewpoint setting status of the user. When the user loses the viewpoint, it is tried to set the viewpoint again. In other words, whether the user has lost the viewpoint can be determined from the viewpoint setting frequency by the user. First, the number of times at which the user enters the viewpoint setting screen in a predetermined time is counted. If the user enters the viewpoint setting screen repeatedly within a predetermined time, it can be determined with high possibility that the user may have lost the viewpoint. Next, even when the number of times of the operation on the viewpoint setting screen is larger than a predetermined number of times, the user has been unable to find the viewpoint with high possibility, and thus it can be determined that the user has lost the viewpoint.

The determination processing will be described with reference to FIG. 7. The information processing device 100 records the time when the user opens the viewpoint setting image (window) (step S701). The determination unit 140 determines whether the user has opened the viewpoint setting image (window) a predetermined number of times or more within a predetermined time (step S702). When the user has opened the viewpoint setting image (window) the predetermined number of times or more within the predetermined time (YES in step S702), the determination unit 140 can recognize that the user needs assistance because the user has a trouble in setting the viewpoint of the virtual camera (the user has lost the viewpoint) (step S705).

On the other hand, when the user has not opened the viewpoint setting image (window) the predetermined number of times or more within the predetermined time (NO in step S702), the information processing device 100 records the content and time of a setting operation performed by the user (step S703). Next, it is determined whether the number of times of the operation in the viewpoint setting image (window) is a predetermined number of times or more, and if the number of times of the operation is the predetermined number of times or more (YES in step S704), it can be recognized that the user has lost the viewpoint (step S705). In other words, the user may not be able to set the viewpoint in the viewpoint setting image (window) and thus may have repeatedly pressed a cancel button, so that it can be determined that the user has lost the viewpoint. Therefore, it can be determined that the user has lost the viewpoint and thus needs assistance in setting the viewpoint.

On the other hand, when the number of times of the operation is less than the predetermined number of times (NO in step S704), the information processing device 100 again records the content and time of the setting operation performed by the user (step S703).

In the present embodiment described above, it can be determined based on the operation on the user terminal that the user has a trouble in setting the viewpoint. As a result, even when the user is unfamiliar with the setting of the free-viewpoint video, it can be determined that the user has lost the viewpoint and thus needs assistance in setting the viewpoint, so that the image can be switched to an appropriate image.

Further, as is apparent from the description on the procedure of the processing in the information processing device or the information processing system in the various embodiments described above, the present disclosure may also take a form as an information processing method. This information processing method comprises: a user-specified video creation step of creating a user-specified video to be distributed to a user terminal from a free-viewpoint video created based on a plurality of captured images captured by a plurality of cameras; an accepting step of accepting an instruction of changing setting of a virtual camera from the user terminal; a determination step of determining, based on the instruction from the user accepted in the accepting step, whether a user needs assistance in setting a viewpoint of the virtual camera from a situation where the user has a trouble in setting the viewpoint of the virtual camera; and a switching step of switching an image being displayed on the user terminal to another image when it is determined in the determination step that the user needs assistance in setting the viewpoint. Note that other examples are as described in the above-described various embodiments. An information processing program is a program for causing a computer to execute such an information processing method.

In the above examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

According to the present embodiments, there can be provided an information processing system, an information processing method, and a program that can determine whether a user needs assistance in switching and setting a virtual camera and can switch a video to be sequentially distributed to an appropriate screen.

What is claimed is:

1. An information processing system comprising:
 a user-specified video creation unit configured to create a user-specified video to be distributed to a user terminal from a free-viewpoint video created based on a plurality of captured images captured by a plurality of cameras;
 an accepting unit configured to accept an instruction of changing setting of a virtual camera from the user terminal;
 a determination unit configured to determine whether a user needs assistance in setting a viewpoint of the virtual camera based on the instruction from the user accepted by the accepting unit;
 a switching unit configured to switch an image being displayed on the user terminal to another image when the determination unit determines that the user needs assistance in setting the viewpoint;
 a professional user virtual camera video creation unit configured to create a virtual camera video by one or more professional users accustomed to the setting of the viewpoint of the virtual camera;
 an automatic virtual camera video creation unit configured to create a virtual camera video for which a position of the virtual camera is automatically set by a computer; and
 a transmission unit configured to transmit the virtual camera video created by the one or more professional users and the virtual camera video for which the position of the virtual camera is automatically set by the computer to the user terminal, wherein
 the determination unit makes a two-stage determination,
 in a first stage, when the accepting unit accepts that a viewpoint setting image is opened a first predetermined number of times or more within a predetermined time, the determination unit determines that the user needs assistance in setting the viewpoint,
 in a second stage, even when it is determined that the user does not need the assistance in setting the viewpoint in the first stage, when the accepting unit accepts that a number of times of operations performed on a setting screen for setting the viewpoint by the user is a second predetermined number of times or more, the determination unit determines that the user needs the assistance in setting the viewpoint,
 when the determination unit determines that the user needs the assistance in the setting the viewpoint, the switching unit switches the user terminal so as to display a professional user selection screen thereon,
 when the user selects one professional user from the professional user selection screen, the switching unit switches the user terminal of the user so as to display a video of the selected professional user thereon, and
 when the user does not select any professional user from the selection screen, the switching unit switches the user terminal of the user so as to display an overhead view video thereon, and urges the user to re-set the viewpoint.

2. An information processing method comprising:
 a user-specified video creation step of creating a user-specified video to be distributed to a user terminal from a free-viewpoint video created based on a plurality of captured images captured by a plurality of cameras;
 an accepting step of accepting an instruction of changing setting of a virtual camera from the user terminal;
 a determination step of determining whether a user needs assistance in setting a viewpoint of the virtual camera based on the instruction from the user accepted in the accepting step;
 a switching step of switching an image being displayed on the user terminal to another image when it is determined in the determination step that the user needs assistance in setting the viewpoint;
 a professional user virtual camera video creation step of creating a virtual camera video by one or more professional users accustomed to the setting of the viewpoint of the virtual camera;
 an automatic virtual camera video creation step of creating a virtual camera video for which a position of the virtual camera is automatically set by a computer; and
 a transmission step of transmitting the virtual camera video created by the one or more professional users and the virtual camera video for which the position of the virtual camera is automatically set by the computer to the user terminal, wherein
 the determination step includes a two-stage determination, in a first stage, when it is accepted that a viewpoint setting image is opened a first predetermined number of times or more within a predetermined time in the accepting step, it is determined that the user needs assistance in setting the viewpoint, in a second stage, even when it is determined that the user does not need the assistance in setting the viewpoint in the first stage, when it is accepted that a number of times of operations performed on a setting screen for setting the viewpoint by the user is a second predetermined number of times or more in the accepting step, it is determined that the user needs the assistance in setting the viewpoint, when it is determined that the user needs the assistance in the setting the viewpoint, the user terminal is switched so as to display a professional user selection screen thereon, when the user selects one professional user from the professional user selection screen, the user terminal of the user is switched so as to display a video of the selected professional user thereon, and when the user does not select any professional user from the selection screen, the user terminal of the user is switched so as to display an overhead view video thereon, and the user is urged to re-set the viewpoint.

3. A non-transitory computer readable medium storing a program causing a computer to execute:

a user-specified video creation step of creating a user-specified video to be distributed to a user terminal from a free-viewpoint video created based on a plurality of captured images captured by a plurality of cameras;

an accepting step of accepting an instruction of changing setting of a virtual camera from the user terminal;

a determination step of determining whether a user needs assistance in setting a viewpoint of the virtual camera based on the instruction from the user accepted in the accepting step;

a switching step of switching an image being displayed on the user terminal to another image when it is determined in the determination step that the user needs assistance in setting the viewpoint;

a professional user virtual camera video creation step of creating a virtual camera video by one or more professional users accustomed to the setting of the viewpoint of the virtual camera;

an automatic virtual camera video creation step of creating a virtual camera video for which a position of the virtual camera is automatically set by a computer; and a transmission step of transmitting the virtual camera video created by the one or more professional users and the virtual camera video for which the position of the virtual camera is automatically set by the computer to the user terminal, wherein the determination step includes a two-stage determination, in a first stage, when it is accepted that a viewpoint setting image is opened a first predetermined number of times or more within a predetermined time in the accepting step, it is determined that the user needs assistance in setting the viewpoint, in a second stage, even when it is determined that the user does not need the assistance in setting the viewpoint in the first stage, when it is accepted that a number of times of operations performed on a setting screen for setting the viewpoint by the user is a second predetermined number of times or more in the accepting step, it is determined that the user needs the assistance in setting the viewpoint, when it is determined that the user needs the assistance in the setting the viewpoint, the user terminal is switched so as to display a professional user selection screen thereon, when the user selects one professional user from the professional user selection screen, the user terminal of the user is switched so as to display a video of the selected professional user thereon, and when the user does not select any professional user from the selection screen, the user terminal of the user is switched so as to display an overhead view video thereon, and the user is urged to re-set the viewpoint.

* * * * *